UNITED STATES PATENT OFFICE.

ROBERT DOUGLAS, OF ROCHESTER, NEW YORK.

FOOD PRODUCT.

1,082,682.

No Drawing.

Specification of Letters Patent. Patented Dec. 30, 1913.

Application filed May 19, 1913. Serial No. 768,428.

*To all whom it may concern:*

Be it known that I, ROBERT DOUGLAS, of Rochester, in the county of Monroe and State of New York, have invented certain new and useful Improvements in Food Products; and I do hereby declare that the following is a full, clear, and exact description of the same.

My present invention has for its object to provide as an article of manufacture, a new and improved substance adapted particularly to be used in the making of jellies and which is adapted either for use in a domestic manner by the housewife or in the more extensive manufacture of jellies, jams and preserved fruits or vegetables for public sale.

To these and other ends the invention consists in certain improvements in the method of producing the improved food product, all as will be more fully described, the novel features being pointed out in the claims at the end of the specification.

My invention, generally described, contemplates the providing of the jelly forming substances of fruit and vegetables, which is so prepared that it may be reduced or condensed in a liquid state without itself becoming hardened or jellified.

Jelly forming substances may be obtained from various fruits or vegetables and I prefer to employ apples as the source of the product on account of their cheapness, the ease with which they may be handled and the comparatively large content of pectose substances which form constituent elements of this fruit. The latter may be treated in various ways to yield the pectous or jelly forming substance, preferably by processing the fruit pulp after the fruit juices have been expressed from the raw fruit to remove the saccharine juices, or natural sugar. This removal of the saccharine juices may also be accomplished by the process of diffusion with water. The fruit pulp thus prepared is then treated with a suitable solvent such as hot or boiling water to which may be added a small proportion of any suitable acid. The addition of the said acid is not at all times necessary and depends largely upon the degree of ripeness of the fruit or its acidity and I only deem its use desirable in comparatively small quantities for the purpose of assisting in liberating the pectous properties of the fruit from the pulp. The treatment of the fruit pulp, it will be understood, may be carried on in any suitable form of vessel or it may be treated in a digester and the processing done under pressure.

The pectous liquors obtained from the fruit pulp are nearly devoid of all natural sugar and I have discovered that the removal or separation of the sugar contents of the fruit from the pectous or jelly forming substance renders these incapable of jellifying by themselves and permits the liquor to be highly reduced or concentrated. To accomplish this and obtain the desired density, I evaporate, preferably *in vacuo*, the excess water and form a syrupy viscous extract. In using the latter, a given quantity thereof may be added to a simple syrup of sugar and water of proper proportion, depending upon the degree of concentration of the pectous product, whereupon the formation of a jelly immediately commences.

A food product obtained in accordance with my invention may be made in various degrees of concentration and when packed in proper containers may be kept indefinitely. My invention further provides a jelly forming substance which may be employed as the jellifying agent in the production of many articles of food.

I claim as my invention:

1. A pectous concentrate rendered non-jellifying in its concentrated form by the removal of the greater part of the natural sugar.

2. A pectous compound from which most of the natural sugar is removed and which is then reduced in volume by evaporation.

3. A concentrated compound of the character described, consisting of a syrupy viscous liquid, which contains soluble pectins or jelly forming substances of fruit or vegetable origin besides other characters derived from the raw material such as small amounts of residuary sugars, acid and mineral matters, its essential characteristic being its property of forming a jelly when combined with definite proportions of sugar and water.

4. The process of producing an unsolidified pectous compound, consisting in treating a fruit or vegetable to remove the natural sugar therefrom, processing the remaining pulp in the presence of a solvent to extract the pectose substances and reducing the liquor thus obtained by evaporation to a syrupy concentrate.

ROBERT DOUGLAS.

Witnesses:
 RUSSELL B. GRIFFITH,
 WALTER B. PAYNE.